United States Patent
Schumacher

(10) Patent No.: US 10,780,622 B2
(45) Date of Patent: Sep. 22, 2020

(54) BLOWN FILM LINE AND METHOD FOR OPERATING A BLOWN FILM LINE

(71) Applicant: Reifenhäuser GmbH & Co. KG Maschinenfabrik, Troisdorf (DE)

(72) Inventor: Holger Schumacher, Sankt Augustin (DE)

(73) Assignee: REIFENHÄUSER GMBH & CO. KG MASCHINENFFABRIK (DE)

( * ) Notice: Subject to any disclaimer, the term of this patent is extended or adjusted under 35 U.S.C. 154(b) by 346 days.

(21) Appl. No.: 15/029,621

(22) PCT Filed: Oct. 15, 2014

(86) PCT No.: PCT/DE2014/000521
§ 371 (c)(1),
(2) Date: Apr. 14, 2016

(87) PCT Pub. No.: WO2015/055169
PCT Pub. Date: Apr. 23, 2015

(65) Prior Publication Data
US 2016/0263810 A1 Sep. 15, 2016

(30) Foreign Application Priority Data
Oct. 15, 2013 (DE) .................. 10 2013 017 072

(51) Int. Cl.
*B29C 47/88* (2006.01)
*B29C 47/00* (2006.01)
(Continued)

(52) U.S. Cl.
CPC ............ *B29C 48/913* (2019.02); *B29C 48/10* (2019.02); *B29C 48/266* (2019.02);
(Continued)

(58) Field of Classification Search
CPC . B29C 47/8835; B29C 47/0872; B29C 47/92; B29C 47/883; B29C 47/0026;
(Continued)

(56) References Cited

U.S. PATENT DOCUMENTS 3,555,604 A 1/1971 Pahlke
3,650,644 A 3/1972 Ebert et al.
(Continued)

FOREIGN PATENT DOCUMENTS

AT 315472 B 5/1974
DE 1211379 B 2/1966
(Continued)

OTHER PUBLICATIONS

International Search Report dated Mar. 31, 2015 re: Application No. PCT/DE2014/000521; pp. 1-3; citing: U.S. Pat. No. 5,576,029 A, WO 2006/032937 A1, EP 0 553 367 A1, DE 89 02 689 U1, JP S54 163174 U, U.S. Pat. No. 4,479,766 A, EP 1 800 832 A2 and U.S. Pat. No. 3,891,374 A.

*Primary Examiner* — Joseph S Del Sole
*Assistant Examiner* — Mohamed K Ahmed Ali
(74) *Attorney, Agent, or Firm* — Tarolli, Sundheim, Covell & Tummino LLP

(57) ABSTRACT

A blow film line and a method for operating the same relates to improving the flow rate in conventional blow film lines without compromising the production quality.
The inner cooling body shows an air outlet path, with a cooling ring being embodied in a height-adjustable fashion, with a controller positioning the cooling ring in a lower area of the inner cooling body for the start-up of the facility. The cooling ring is positioned in the upper area of the air outlet path of the inner cooling body in order to achieve the steady-state production.

14 Claims, 1 Drawing Sheet

(51) Int. Cl.
*B29C 48/88* (2019.01)
*B29C 48/10* (2019.01)
*B29C 48/25* (2019.01)
*B29C 48/27* (2019.01)
*B29C 48/92* (2019.01)
*B29C 55/28* (2006.01)
*B29L 23/00* (2006.01)

(52) U.S. Cl.
CPC ............ *B29C 48/269* (2019.02); *B29C 48/27* (2019.02); *B29C 48/9125* (2019.02); *B29C 48/92* (2019.02); *B29C 55/28* (2013.01); *B29C 2948/92571* (2019.02); *B29C 2948/92971* (2019.02); *B29L 2023/001* (2013.01)

(58) Field of Classification Search
CPC ............ B29C 47/0866; B29C 47/0877; B29C 2947/92571; B29L 2023/001
USPC .................................. 425/72.1, 192 R, 326.1
See application file for complete search history.

(56) References Cited

U.S. PATENT DOCUMENTS

| | | | |
|---|---|---|---|
| 3,891,374 A | 6/1975 | Ninomiya | |
| 4,101,614 A * | 7/1978 | Havens | B29C 47/883 264/237 |
| 4,325,897 A * | 4/1982 | Zerle | B29C 47/92 264/40.3 |
| 4,479,766 A | 10/1984 | Planeta | |
| 4,601,649 A | 7/1986 | Upmeier | |
| 4,606,879 A | 8/1986 | Cerisano | |
| 4,699,580 A * | 10/1987 | Co | B29C 47/0026 137/223 |
| 4,842,803 A | 6/1989 | Bose et al. | |
| 5,126,096 A | 6/1992 | Grady | |
| 5,576,029 A | 11/1996 | Planeta | |
| 6,273,699 B1 | 8/2001 | Finke | |
| 2007/0267183 A1* | 11/2007 | Hennes | B29C 47/0026 165/121 |
| 2012/0200001 A1* | 8/2012 | Joppe | B29C 48/10 264/209.8 |

FOREIGN PATENT DOCUMENTS

| | | |
|---|---|---|
| DE | 1504648 A1 | 10/1969 |
| DE | 2608311 A1 | 9/1977 |
| DE | 2639551 A1 | 3/1978 |
| DE | 2924897 A1 | 6/1980 |
| DE | 3436881 A1 | 4/1986 |
| DE | 3241192 C2 | 5/1987 |
| DE | 8902689 U1 | 4/1989 |
| DE | 3815415 A1 | 11/1989 |
| DE | 3903174 A1 | 8/1990 |
| DE | 4405463 A1 | 8/1995 |
| EP | 0553367 A1 | 8/1993 |
| EP | 1800832 A2 | 6/2007 |
| JP | 54163174 U | 11/1979 |
| WO | 2006032937 A1 | 3/2006 |

* cited by examiner

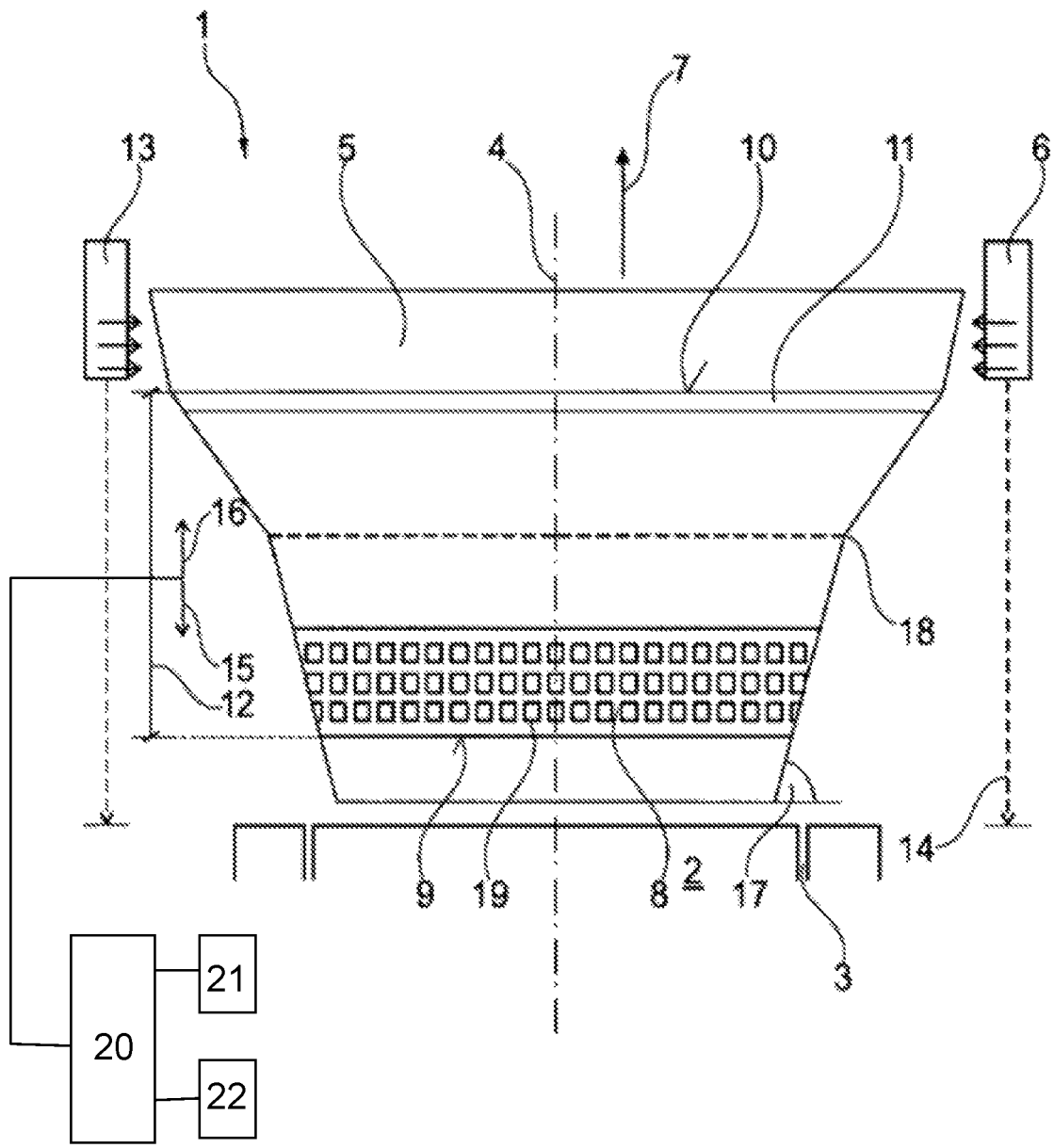

BLOWN FILM LINE AND METHOD FOR OPERATING A BLOWN FILM LINE

CROSS-REFERENCE TO RELATED APPLICATIONS

This application is related to and claims the benefit of German Patent Application No. DE 10 2013 017 072.9, filed on Oct. 15, 2013, and PCT Application No. PCT/DE2014/000521, filed on Oct. 15, 2014, the contents of which are herein incorporated by reference in their entirety.

TECHNICAL FIELD

The disclosure relates to a blow film line and a method for operating a blow film line.

BACKGROUND

Blow film lines are widely known in prior art. They are used to produce large-format films from a molten thermoplastic synthetic material in the form of hoses.

One or more extruders melt the source material in the form of thermoplastic synthetic material and homogenize it. The resulting plasticized melt is pressurized and is introduced via channels into a blow head. Here, single or multi-layered films are generated, exiting the blow head through an annular nozzle. Therefore, a still molten film hose exits the annular nozzle upwards. The inside of the film hose is pressurized. This causes the film hose to radially expand, due to the still molten state in the direction of extrusion, usually upwards in practice, until the solidity of the film hose is of such strength that the film hose no longer experiences any expansion under the internal pressure. In practice, this is frequently called the "frost line". Simultaneously, a pair of draw rolls pulls the film hose along the direction of extrusion and this way causes a longitudinal extrusion in addition to the lateral extrusion by the inflation.

In most applications it is advantageous to adjust the frost line as low as possible, thus as closely as possible near the exit of the melt from the annular nozzle. In practice, accordingly cooling means are used both inside as well as outside the film hose: For this purpose, a so-called "internal cooling body" is provided at the inside as appropriate. Usually "air cooling rings" or in any case one air cooling ring is provided at the outside.

DE 1 211 379 presents an arrangement in which a hose is produced from an annular-shaped die. The hose is expanded by the introduction of blowing air, with the blowing air being introduced into the hose between the nozzle and a cooling body cooled by water. The blowing air to expand the blow film is cooled by a double-wall cooling body, with water flowing through it. This cooled air can extract heat from the blow film.

DE 26 08 311 A1 shows an arrangement in which the film at its interior is cooled with a cooling body, cooled with water, and at its exterior by direct contact with water.

DE 39 03 174 A1 shows a blow film arrangement in which for interior cooling of the film hose a cooling cylinder is provided, in which at four discrete points, distributed over the height of the cylinder, cooling air grooves are provided around the perimeter of the cylinder.

DE 29 24 897 A1 shows a cylindrical stabilizer for blowing resin, which heats the film hose from the inside, however expands its diameter. In return, a cooling ring is provided at the outside around the film hose. The inner stabilizer comprises engraved or cut patterns, particularly in the form of grooves.

EP 1 800 832 A2 shows an inner cooling body for a blow film line. The inner cooling body comprises flow channels at its jacket area, with their progression at least partially extending over a section of a longitudinal extension of the inner cooling body. Eddies develop through this macroscopically structured surface at the inner cooling body, which ensure for a cushioned guide of the rising flow film hose.

Blow film lines are frequently equipped with cooling rings or even with double cooling rings, in order to increase the flow rate of these devices. The melt between the first and the second cooling ring is already extended to a certain ratio. This leads to the melt being more easily cooled at the upper cooling ring, due to the lower thickness. Here, more than two cooling rings may also easily be used.

DE 32 41 192 C2 describes a blow film line with a first cooling ring, which is arranged downstream directly following a nozzle, a second cooling ring, which is arranged closely upstream in reference to calibration, and an iris diaphragm, optionally arranged there between, which shall prevent any vibration of the film hose.

Other blow film lines and cooling rings are known from DE 44 05 463 A1, DE 34 36 881 A1, U.S. Pat. Nos. 4,601,649 B, 3,555,604 B, 4,606,879 B, 6,273,699 B, 5,126,096 B, 4,842,803 B, 5,576,029 B, the lecture "IKV-Fachtagung Folienextrusion—Rohstoffe, Verarbeitung, Anwendungen; Steigerung des Durchsatzes durch innovative Ansätze zur Schlauchkülung bei der Blasfolienextrusion" [IKV-special meeting Film extrusion—raw materials, processing, applications; increase of flow rate by innovative approaches for cooling hoses in blow film extrusion] dated Sep. 22/23, 2008 in Aachen, presented by Dr. Christoph Lettowsky, at said time Extrusion GmbH, Worms, as well as from the article "Wasser mit Luft kombiniert" [water combined with air] by Dr. Christoph Lettowsky, published in Carel Hanser Verlag, Munich, in the journal "Kunststoffe [plastics] November 2008", as well as known from DE 1 504 648, U.S. Pat. No. 3,650,644, AT 315 472, DE 26 39 551 A1, and DE 38 15 415 A1.

SUMMARY

The present disclosure relates to increasing the flow rate while maintaining secure production.

According to the disclosure, a blow film line is provided with an inner cooling body comprising an air outlet path, with the inner cooling body being embodied at least over an overwhelming portion of the air outlet path in a monotonously or strictly monotonously expanding fashion, and with a cooling ring, which can be adjusted in its height, being provided for cooling from the outside a blow film hose traveling during the operation of the blow film line, with here the blow film line being implemented to position the cooling ring during the steady-state production in the upper half of the air outlet path, particularly preferred in the upper third.

According to the disclosure, a blow film line is provided comprising an inner cooling body with an air outlet path, with the inner cooling body being embodied at least over an overwhelming portion of the air outlet path in a monotonously or strictly monotonously expanding fashion, and with a cooling ring, which can be adjusted in height, being provided for cooling from the outside a blow film hose traveling during operation of the flow film line, with the blow film line being implemented to position the cooling ring during the steady-state production in the lower half of the air outlet path, particularly preferred in the lower third.

With regards to terminology, the following is explained:

Within the scope of the present patent application, indefinite articles and numeric statements, such as "one . . . ", "two . . . " etc. shall regularly be understood as minimum statements, thus representing "at least one . . . ", "at least two . . . " etc., except when it is discernible from the respective context that here for example, only "precisely one . . . ", "precisely two . . . " etc. shall be understood.

The wording of the present patent application is selected such that it describes a blow film line, which allows for a film hose to rise from the bottom towards the top, thus being blown out of the annular nozzle opposite the forces of gravity and pulled upwards. However, it shall be explicitly emphasized that the disclosure can also be applied to a device blowing downwards along with the forces of gravity. All explanations given here shall then be appropriately adjusted, thus in most cases simply inverted.

The "inner cooling body" represents a body provided inside the limits designated by the film hose, which is connected to the air driving means, primarily to a pump such that the air can be blown via an "air outlet path" in a pressurized fashion out of the inner cooling body and this way impinges the blow film surrounding the inner cooling body during the operation of the blow film line.

The dimension of the "air outlet path" shall be sized in a projection of the open area provided at the inner cooling body towards the air outlet along the extrusion axis, thus along a central axis of the film hose traveling from the annular nozzle towards the pulling unit.

The air outlet path will in most cases represent the entire height at which the air is blown out at the inner cooling body.

However, constructive embodiments are also possible in which initially the inner cooling body blows out the very overwhelming portion of the air, with another air outlet being located there above at a vertical distance, either in the form of a punctual air outlet in reference to the height or an air outlet with a vertical extension. In such a constellation, only the lower part of the air outlets is understood as the "air outlet path", when less than 10% of the air is blown out above the first air outlet path. In most cases, the air outlet path will maximally be approx. 1 m high, or for example also up to 2 m high.

A simplifying constellation can abut the upper end of the air outlet path, where, beginning at the lower end of the compressed air outlet, over the rising height at the inner cooling body in the mathematical sense integrated 90% or 95% of the pressurized air flow has added from the inner cooling body. In a simple inner cooling body with a one-piece air outlet path this definition will in general deviate slightly by a few cm from the purely geometrical air outlet path, but presumably particularly in multi-part air outlet paths it will frequently lead to a definition that can be applied with confidence.

Any "expanding" of the inner cooling body represents that the inner cooling body at least essentially shows at every cross-section normally a circular shape with a diameter along the direction of extrusion, with said diameter monotonously or strictly monotonously increasing along the direction of extrusion. The diameter shall represent the smallest circular perimeter of each cross-section, with the air outlet slots being negligible, here.

The "height adjustable" cooling ring must be effectively connected to a height adjusting means, for example a conventional motor, a stepper motor, a torque-motor, a hydraulic or pneumatic, or any other drive. It is important that the drive is implemented to adjust the cooling ring in its height also during operation of the blow film line, thus in its distance from the annular shaped die in the blow head. The blowing can occur upwards or downwards.

When starting the production at a blow film line, no complete film hose is provided from the blow head to the pull-off device. Rather, initially the film hose coming from the blow head is manually grasped and guided to the pull-off device. When the pull-off begins to pull, the equipment can slowly approach a continuous production stage, thus the status "steady-state production".

The "positioning" of the cooling ring in the upper half of the air outlet path shall represent that either the air outlet slots or air outlet holes at the cooling ring show in the vertical projection to the axis of extrusion an appropriate height above the blow head in the air outlet path, or that the air impingement line of the air blown by the cooling ring on the film hose shows a respective height, or preferably both.

Experiments of the inventor using prototypes have shown that with the disclosure, considerably increased flow rates can be achieved even in reference to arrangements already showing high flow rates, without here the quality of the production being compromised.

The inner cooling body can preferably show a structured surface. With regards to the various options of a structured surface, reference shall be made to the content disclosed in EP 1 800 832 A2, with its entire content disclosed being hereby included by way of reference.

The inner cooling body may show annular grooves, which are designed as air outlets. The annular grooves themselves may for example show several discrete bore holes, through which they are provided with pressurized air from the inside.

Alternatively or cumulative it is possible that the inner cooling body shows a perforated sheet at its surface. Such a perforated sheet may be used, due to the plurality of round, square, rectangular, or otherwise designed air outlets, also for blowing cooling air to the film hose.

It is suggested that the inner cooling body shows a functionally modified surface.

The surface of the inner cooling body is generally made from metal. A functional surface modification may represent for example a coating.

For example, modifications are possible for reducing the precipitation of paraffin or for reducing the surface roughness or for influencing the thermal conductivity.

It seems advantageous for the height adjusting means for the cooling ring to be connected effectively to a manual switch, with the switch showing a rising position, a lowering position, and a holding position. This way the cooling can easily and manually be adjusted in height.

When the height adjusting means is effectively connected to a manual switch 21, with the switch showing a spring-loaded rising position and a spring-loaded lowering position, here the operator can control the switch like a feeler. Either the operator holds the switch in the position against the spring force for raising or lowering, and the cooling ring stops as soon as the operator releases the switch, so that it is reset by the spring force; or the operator pushes the switch briefly against the spring force towards one of the two spring-loaded end positions, then allows the switch to resiliently return, and the cooling ring moves automatically into an upper and/or a lower end position.

If the height adjusting means is effectively connected to a controller and the controller is in a data transmitting connection to a recipe database, with the controller being implemented to read data from the recipe database for a target height position of the cooling ring, primarily for precisely two target height positions, and to appropriately control or regulate the height adjusting means, then the method of the cooling ring can occur automatically. The automatic control can extend to temporal or local details of the displacement, preferably to both.

It has already been mentioned that preferably a controller is provided which is effectively connected to a height adjusting means of the cooling ring.

The controller may be implemented to keep the cooling ring stationary during the steady-state production, or it may be designed to keep the cooling ring in motion during the steady-state production, due to continuous measurements, with in the latter variant a control being achieved such that the controller shall also be in a data transmitting connection to a measuring means, for example a measuring means for the thickness of the film at the film hose.

In the preferred embodiment the controller is embodied to position the cooling ring during the start-up phase of the blow film line under the area described in the first aspect of the disclosure, thus in the lower half of the air outlet path, and for the steady-state production to displace the air cooling ring then into the upper area, and here to keep it during the steady-state production, at least over the very overwhelming portion of the time, preferably over at least 90% of the time.

According to the disclosure, a method is provided for operating a blow film line as described above, with for the start of the blow film line the cooling ring set to a position lower than the upper half of the air cooling path, and then in order to achieve the steady-state production the cooling ring is displaced upwards.

BRIEF DESCRIPTION OF THE DRAWINGS

In the following, the disclosure is explained in greater detail based on an exemplary embodiment with reference to the drawing.

FIG. 1 is a schematic in a longitudinal cross-section the upper edge of a blow head with an annular nozzle, the lower part of an inner cooling body, as well as a height-adjustable cooling ring, each at a blow film line.

DETAILED DESCRIPTION OF THE DRAWINGS

The blow film line 1 in FIG. 1 (shown only partially) comprises with regards to the extrusion of a plastic melt essentially the blow head 2 with an annular shaped die 3, which is arranged rotationally-symmetrical around an extrusion axis 4, as well as an inner cooling body 5 located upstream thereof, and a cooling ring 6. During operation of the blow film line 1 a plastic melt is extruded through the annular shaped die 3 in a direction of extrusion 7, thus vertically upwards. In its diameter, perpendicular in reference to the axis of extrusion 4, the blow film expands then along the direction of extrusion 7 around the inner cooling body 5, preferably without contacting it.

Air outlet sections are arranged along the height of the inner cooling body 5, for example air outlet grooves or perforated sheets 8 with pressurized air flowing behind them (shown as an example).

From a lowest height 9, at which cooling air is blown out of the inner cooling body 5, to an uppermost height 10, here for example represented by an air outlet groove 11, an air outlet path 12 extends parallel in reference to the axis of extrusion 4.

The cooling ring 6 shows air outlet nozzles 13 (numbered as examples). The cooling ring 6 is additionally positioned along a displacement path 14 in a manner adjustable in height along the inner cooling body 5. A height adjusting means 20 is effectively connected to a controller 22 so that within certain maximal limits the controller can displace the cooling ring 6, more precisely its area at the air outlet nozzles 13 projected to the axis of extrusion 4.

The preferred embodiment of the disclosure provides that the air outlet nozzles 13 of the cooling ring 6 or in case of several cooling rings of at least one cooling ring, preferably however of all cooling rings, preferably during the start-up phase of the equipment are positioned in a lower area 15 of the air outlet path 12, in any case however during the steady-state production in an upper area 16.

The inner cooling body 5 may, as shown in the present example, be provided with different angles of incline 17 of its jacket, here for example initially showing a strictly monotonously expanding angle of incline 17, then a bend 18, followed again by a stronger, strictly monotonously increasing area in its diameter, and finally a strictly monotonous, less increasing area in the diameter. Prototype tests of the inventor have shown that the diameter of the inner cooling body 5 should expand strictly monotonously or at least monotonously, with preferably at least one section being provided with strictly monotonous expansion, thus a non-cylindrical area with an incline angle 17 of the jacket being ☐☐90°, with the angle potentially changing rapidly or steadily over the vertical extension. Any small recesses in the surface of the inner cooling body 5 potentially formed by air outlets, such as caused by each recess 19 in the perforated sheet 8, are not considered, here. Rather, the actual surface contour is being discussed.

When the diameter expands in a strictly monotonous fashion along the direction of extrusion, here the blow film hose is subject to tensile stress over the entire distance due to the also strictly monotonous expansion, which can prevent the formation of creases.

The invention claimed is:

1. A blow film line comprising an inner cooling body with an air outlet path, the inner cooling body being embodied at least over an overwhelming part of the air outlet path in a monotonously or strictly monotonously expanding fashion, and a height-adjustable cooling ring that cools a blow film hose from outside the inner cooling body, the height-adjustable cooling ring traveling along a displacement path that extends along the entire inner cooling body during the operation of the blow film line, wherein the cooling ring is positioned in an upper half of the air outlet path during a steady-state production, and wherein the cooling ring is positioned in a lower half of the air outlet path during a start-up phase; wherein a controller is provided, which is connected to a height adjusting means of the cooling ring, wherein the controller is embodied to position the cooling ring during the start-up phase of the blow film line underneath the upper area and/or in a lower area, and to move it for the steady-state production into the upper area and/or to move it upwards within the lower area.

2. A blow film line comprising an inner cooling body with an air outlet path, whereby the inner cooling body is embodied at least over an overwhelming part of the air outlet path in a monotonously or strictly monotonously expanding fashion, and whereby a height-adjustable cooling ring is provided for cooling a blow film hose from the outside during the operation of the blow film line, wherein the height-adjustable cooling ring traveling along a displacement path that extends along the entire inner cooling body during the operation of the blow film line, whereby the blow film line is embodied to position the cooling ring in the lower half of the air outlet path during the steady-state production, particularly preferred in the lower third; and a controller is provided, which is connected to a height adjusting means of the cooling ring, wherein the controller is embodied to position the cooling ring during the start-up phase of the blow film line underneath the upper area and/or in a lower area, and to move it for the steady-state production into the upper area and/or to move it upwards within the lower area.

3. A blow film line according to claim 1, wherein the blow film line is implemented to allow the blow film hose to travel upwards and to pull it off.

4. A blow film line according to claim 1, wherein the inner cooling body shows a structured surface.

5. A blow film line according to claim 1, wherein the inner cooling body further includes a plurality of annular grooves which are embodied as a plurality of air outlets.

6. A blow film line according to claim 1, wherein the inner cooling body comprises a perforated sheet at its surface.

7. A blow film line according to claim 1, wherein the inner cooling body comprises a functionally modified surface.

8. A blow film line according to claim 7, wherein the inner cooling body comprises a coating.

9. A blow film line according to claim 1, wherein the height adjusting means is provided for the cooling ring, which shows a drive.

10. A blow film line according to claim 9, wherein the height adjusting means is connected to a manual switch, with the switch comprising a rising setting, a lowering setting, and a holding setting.

11. A blow film line according to claim 9, wherein the height adjusting means is connected to a manual switch, and the manual switch includes a spring-loaded rising setting and a spring-loaded lowering setting.

12. A blow film line according to claim 9, wherein the height adjusting means is connected to the controller, and the controller is connected to a recipe database in a data transmitting fashion, wherein the controller is embodied to read data from the recipe database regarding a target height position of the cooling ring, primarily regarding precisely two target height positions, and the height adjusting means being appropriately addressed or regulated.

13. A blow film line according to claim 1, wherein the controller is provided, which is connected to the height adjusting means of the cooling ring, wherein the controller is embodied to keep the cooling ring locally fixed during the steady-state production.

14. A blow film line according to claim 1, wherein the controller is provided, which is connected to the height adjusting means of the cooling ring, wherein the controller is implemented to keep the cooling ring in motion during the steady-state production based on continuous measurements.

* * * * *